United States Patent [19]

Matsushita

[11] Patent Number: 5,325,933

[45] Date of Patent: Jul. 5, 1994

[54] STEERING CONTROL OF TRACKED VEHICLE

[75] Inventor: Shigenori Matsushita, Ninomarumachi, Japan

[73] Assignee: Kabushiki Kaisha Komatsu Seisakusho, Tokyo, Japan

[21] Appl. No.: 994,626

[22] Filed: Dec. 21, 1992

[51] Int. Cl.$^5$ ................ B62D 11/08; F16D 67/04
[52] U.S. Cl. ................ 180/6.7; 180/9.44; 192/13 A
[58] Field of Search ............... 180/6.2, 6.7, 78, 9.44, 180/9.1; 192/13 R, 12 C, 13 A

[56] References Cited

U.S. PATENT DOCUMENTS

| | | | |
|---|---|---|---|
| 3,907,052 | 9/1975 | Shaw | 180/6.7 |
| 4,037,677 | 7/1977 | Koch | 180/6.7 |
| 4,042,052 | 8/1977 | Koch | 180/6.7 |
| 4,093,048 | 6/1978 | Hakes et al. | 180/6.2 X |
| 4,101,004 | 7/1978 | Oltman | 180/6.2 |
| 4,116,291 | 9/1978 | Brungart | 180/6.2 |
| 4,246,992 | 1/1981 | Hakes et al. | 180/6.7 X |
| 4,299,300 | 11/1981 | Hakes et al. | 180/6.2 |
| 4,372,408 | 2/1983 | Chatterjea | 180/6.2 |
| 4,479,563 | 10/1984 | Horsch | 180/6.7 |
| 4,702,358 | 10/1987 | Mueller et al. | 180/6.7 X |
| 4,754,824 | 7/1988 | Olsson | 180/6.2 X |
| 4,858,739 | 8/1989 | Nemoto | 180/6.2 X |
| 4,949,823 | 8/1990 | Coutant et al. | 180/6.2 X |

Primary Examiner—Brian L. Johnson
Assistant Examiner—Florian Zeender
Attorney, Agent, or Firm—Richards, Medlock & Andrews

[57] ABSTRACT

A steering control system for a tracked vehicle having a left track and a right track, e.g., a bulldozer, assures smooth turning performance in a normal steering operation, provides a comfortable ride, and is durable. Power is transmitted to the right and left tracks via right and left drive sprockets having right and left driving shafts, with the right driving shaft being coupled to an output shaft of a speed change gear via a right clutch and a right brake, and the left driving shaft being coupled to the output shaft via a left clutch and a left brake. The steering control system includes electrically actuated proportional control valves (19R, 19L, 20R, 20L) for separately controlling the right clutch, the left clutch, the right brake and the left brake; a steering lever (15); a steering signal generator (15a) for generating a steering signal corresponding to the operation of the steering lever; and a controller (17) for inputting the steering signal and for outputting a steering control signal to the electrically actuated proportional control valves (19R, 19L, 20R, 20L). The time interval from the disengagement of a clutch to the engagement of the associated brake is controlled to obtain smooth steering characteristics.

15 Claims, 9 Drawing Sheets

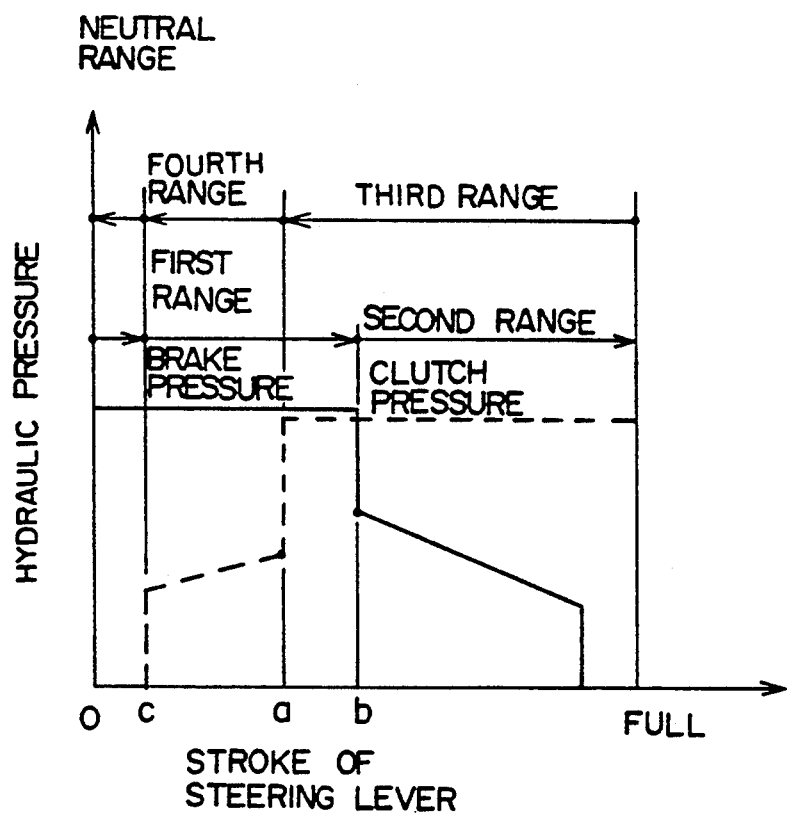
F I G. 3

STEERING CONTROL OF TRACKED VEHICLE

FIELD OF THE INVENTION

The present invention relates to an automatic steering control system for a tracked vehicle, e.g., a bulldozer, and more particularly, to an electrical steering control device for a bulldozer which does not require fine control operations to obtain a smooth turning performance, which provides a comfortable vehicle for the operator to ride, and which is durable, as well as a method for automatically controlling the steering of a tracked vehicle.

BACKGROUND OF THE INVENTION

FIG. 10 illustrates the structure of a conventional clutch brake type steering control system. In FIG. 10, reference numeral 1 denotes an engine; 2 denotes a torque converter unit including a torque converter 2a and a lock-up clutch 2b; 3 denotes a speed change gear having forward and reverse clutches F and R, and first, second and third gear clutches 3a, 3b and 3c; 4 denotes a steering unit which includes an input shaft 5, a speed change gear mechanism 6, a horizontal input shaft 7, right and left clutches 8R and 8L, intermediate shafts 9R and 9L, brakes 10R and 10L, and output shafts 11R and 11L; 12R and 12L respectively denote right and left last reduction gears; 13R and 13L respectively denote right and left output shafts; and 14R and 14L respectively denote right and left drive sprockets. Reference numeral 18 denotes a control pump which supplies hydraulic fluid to the clutch operation valves 49L, 49R, and to the brake operation valves 50L, 50R. The steering of the bulldozer is performed by the components located between the engine 1 and the drive sprockets 14R and 14L.

FIG. 11 schematically shows a control device for both the right and left clutches 8R and 8L and the right and left brakes 10R and 10L. Reference numeral 15R denotes a manually operated right track steering lever; 15L denotes a manually operated left track steering lever; 16 denotes a brake pedal; 46R and 46L denote steering lever arms; 47R and 47L denote brake lever arms; 49R and 49L denote clutch operation valves for supplying a controlling hydraulic pressure to the right and left clutches 8R and 8L in accordance with the amount of operation of the right track and left track steering levers 15R and 15L, respectively; 50R and 50L denote brake operation valves for supplying a controlling hydraulic pressure to the right and left brakes 10R and 10L, respectively; 51R and 51L denote steering links; 52 denotes a rod; 53 denotes a brake link; 54 denotes a returning spring for the rod 52; and 55R and 55L denote adjusting bolts.

The control method of the structure shown in FIGS. 10 and 11 is described below. As the right track steering lever 15R is operated in a direction indicated by the reference character A during the running of the bulldozer, it starts pushing a rod 49r of the clutch operation valve 49R via the steering link 51R and the steering lever arm 46R. As the clutch operation valve 49R starts supplying the control pressure to the right clutch 8R, the right clutch 8R starts becoming disengaged. As the right steering lever 15R is further operated in the direction indicated by the reference character A, the right clutch 8R becomes completely disengaged and the steering lever arm 46R starts pushing a rod 50r on the brake operation valve 50R. As the control pressure of the right brake 10R starts decreasing, the right brake 10R starts being engaged.

When the brake pedal 16 is depressed during the rightward steering operation, the rod 52 is pushed down against the spring 54, pushing the rods 50r and 50l of the right and left brake valves 50R and 50L via the brake link 53 and then the right and left brake lever arms 47R and 47L, whereby the right and left brakes 10R and 10L can be engaged in accordance with the amount of operation of the brake pedal 16. At that time, the right brake operation valve 50R is controlled in accordance with whichever is the largest: the amount of operation of the rod 50r of the right brake operation valve 50R by the right track steering lever 15R, or the amount of operation of the rod 50r of the right brake operation valve 50R by the brake pedal 16.

As the movement of the left track steering lever 15L in a direction indicated by the reference character A results in an operation similar to that performed when the right track steering lever 15R is moved in the direction indicated by the reference character A, the description thereof is omitted.

FIGS. 12 and 13 show the modulation characteristics between a clutch and the associated brake when the clutch is turned off (disengaged) and the brake is turned on (engaged). The ordinate axis represents the hydraulic pressure of a hydraulic oil, while the abscissa axis represents the time during the operation of the respective steering lever.

FIG. 12 shows how the hydraulic pressure for the right clutch 8R and the hydraulic pressure for the right brake 10R change with time when the right track steering lever 15R is operated slowly. As can be seen from FIG. 12, the right brake 10R starts being engaged after the right clutch 8R has been disengaged. Thus, the hydraulic pressure for the clutch and that for the brake change smoothly. This shows that no shock is given to the vehicle.

FIG. 13 shows changes in the hydraulic pressure when the right track steering lever 15R is operated rapidly. As can be seen from FIG. 13, the right brake 10R starts being engaged before the right clutch 8R has been completely disengaged. Thus, the hydraulic pressure for the brake changes greatly. This shows that a large shock is given to the vehicle. To prevent generation of the shock, the steering lever arms 46R and 46L are respectively provided with the adjusting bolts 55R and 55L. The adjusting bolts 55R and 55L are used to adjust the operation interval between the clutches 8R, 8L and the brakes 10R, 10L, and hence provide a time interval between the release of the clutch and the engagement of the brake or between the release of the brake and the engagement of the clutch.

However, when the steering operation is performed at an inclined site, the clutch and the brake, which are provided for the crawler track on the side of the vehicle to which the steering lever is moved, are disengaged at the same time for a certain period of time. As a result, the crawler track provided on the side of the vehicle to which the steering lever is operated travels by its weight, and the vehicle thus turns in a direction opposite to that in which the steering lever is moved, i.e., a so-called reverse steering phenomenon occurs. This may be prevented by engaging the brake before the clutch is disengaged or by engaging the clutch before the brake is released. However, this results in the clutch and the brake being engaged at the same time, generating a shock when the steering lever is operated during running and thus deteriorating the comfortable riding of the operator.

SUMMARY OF THE INVENTION

In view of the aforementioned problems of the conventional technique, an object of the present invention is to provide a steering control system for a tracked vehicle, e.g., a bulldozer, and a method thereof which ensure that no shock occurs even when the operator actuates the steering lever during the running of the vehicle, and which assure a comfortable ride.

In one aspect of the present invention, there is provided an electrical steering control device for a tracked vehicle which transmits power of an engine to right and left drive sprockets by means of right and left driving shafts, each of the driving shafts being coupled to an output shaft of a speed change gear via a respective clutch and a respective brake. The electrical steering control system comprises electrically actuated control valves for separately controlling the left and right clutches and the left and right brakes, a steering lever, a steering signal generator for generating a steering signal corresponding to an amount and direction of operation of the steering lever, and a controller for receiving the steering signal from the steering signal generator and for outputting steering control signals to the electrically actuated control valves.

In the above-described structure of the invention, when the steering lever is in its neutral position (not being operated) during the running of the vehicle, the right and left clutches are engaged while the right and left brakes are disengaged, since no steering control signal is outputted from the controller to the electrically actuated control valves which would require a change from such neutral conditions. Accordingly, the power of the engine, which is transmitted to the right and left driving shafts, is further transmitted to the right and left drive sprockets in the same direction and at the same rotational speed to make the vehicle travel straight, either forwardly or rearwardly as dictated by the actuation of the forward clutch or the reverse clutch.

When the steering lever is operated to the right from its neutral position while the vehicle is running, the steering signal generator outputs to the controller an increasing steering signal, corresponding to the direction of operation of the steering lever and to the amount of operation of the steering lever from its neutral position and having predetermined elapsed characteristics. In turn, the controller transmits a steering control signal to the electrically actuated control valve for the right clutch to generate a clutch hydraulic pressure which exhibits predetermined elapsed characteristics determined by the steering control signal from the controller and/or to the electrically actuated control valve for the right brake to generate a brake hydraulic pressure which exhibits predetermined elapsed characteristics determined by the steering control signal from the controller. Consequently, the right clutch hydraulic pressure increases in response to the amount of operation of the steering lever. The braking is initiated a predetermined period of time after the clutch has been disengaged. As the braking power of the brake gradually increases thereafter, the power transmitted from the engine to the right drive sprocket gradually decreases, reducing the rotational speed of the right drive sprocket. Thus, the vehicle turns to the right due to the smooth steering modulation characteristics, which are free from shock.

When the steering lever is returned to its neutral position while the vehicle is turning to the right, the steering signal generator outputs to the controller a decreasing steering signal, corresponding to the direction of operation of the steering lever and to the amount of operation of the steering lever from its neutral position and having predetermined elapsed characteristics. In turn, the controller transmits a steering control signal to the electrically actuated control valve for the right clutch to generate a clutch hydraulic pressure which exhibits predetermined elapsed characteristics determined by the steering control signal from the controller and/or to the electrically actuated control valve for the right brake to generate a brake hydraulic pressure which exhibits predetermined elapsed characteristics determined by the steering control signal from the controller. Consequently, the right clutch hydraulic pressure decreases in response to the stroke (movement) of the steering lever toward the neutral position. Also, since the clutch is engaged a predetermined period of time after the brake has been disengaged, the power of the engine transmitted to the right drive sprocket gradually increases, gradually increasing the rotational speed of the right drive sprocket. Thus, the vehicle retrieves the straight travelling posture due to the smooth steering modulation characteristics, which are free from shocks.

As the operations when the steering lever is operated to the left and then the steering lever is returned to the neutral position correspond to those when the steering lever is operated to the right and then the steering lever is returned to the neutral position, the description thereof is omitted.

The amount of operation of the steering lever is considered to be the amount (degree) of movement of the steering lever from its neutral position. The movement of the steering lever away from the neutral position and towards its full stroke position is considered to be an "increasing steering lever operation" while the movement of the steering lever away from its full stroke position towards the neutral position is considered to be a "decreasing steering lever operation".

When the amount of operation of the steering lever increases from its neutral position to its full stroke, the changes with time of the steering control signals outputted by the controller to the electrically actuated control valves include, in sequence: a first range in which a clutch hydraulic pressure changes from a clutch completely engaging pressure to a clutch engagement maintaining pressure having a magnitude corresponding to the amount of the stroke of the steering lever from its neutral position, while the brake hydraulic pressure is a brake completely disengaging pressure; and a second range in which the clutch hydraulic pressure is the clutch engagement maintaining pressure or changes from the clutch engagement maintaining pressure to a clutch completely disengaging pressure while the brake hydraulic pressure changes from a braking preparation pressure, which is slightly higher than an initiating brake engagement pressure, to a brake completely engaging pressure. When the amount of operation of the steering lever decreases from the full stroke to the neutral position, the changes with time of the steering control signals include, in sequence: a third range in which the brake hydraulic pressure changes from the brake completely engaging pressure to a brake engagement maintaining pressure having a magnitude corresponding to the amount of the stroke of the steering lever from its neutral position, with the clutch hydraulic pressure being the clutch completely disengaging pressure; and a fourth range in which the brake hydraulic pressure is the brake engagement maintaining pressure or changes from the brake engagement maintaining pressure to the brake completely disengaging pressure while the clutch hydraulic pressure changes from a clutch preparation pressure, which is slightly higher than a clutch engagement initiating pressure, to the clutch completely engaging pressure.

Accordingly, each of the electrically actuated control valves generates a hydraulic pressure which is representative of, and preferably in proportion to, the steering control signal inputted thereto; and the braking and clutch hydraulic pressures thus change with time in the same manner as that in which the steering control signal outputted from the controller to the respective electrically actuated control valve changes with time.

The first range, which occurs in the increasing steering lever operation, has an initial portion wherein the clutch hydraulic pressure changes from a clutch completely engaging pressure to a maximum value for a clutch engagement maintaining pressure while the brake hydraulic pressure is a brake completely disengaging pressure, and a subsequent portion wherein the clutch hydraulic pressure remains at the maximum value for a clutch engagement maintaining pressure while the brake hydraulic pressure remains at a brake completely disengaging pressure.

The second range, which occurs in the increasing steering lever operation, has an initial portion wherein the brake hydraulic pressure changes from a brake completely disengaging pressure to the braking preparation pressure and the clutch hydraulic pressure changes from the maximum value of the clutch engagement maintaining pressure to a clutch completely disengaging pressure, and a subsequent portion wherein the brake hydraulic pressure changes from the braking preparation pressure to a brake completely engaging pressure while the clutch hydraulic pressure is a clutch completely disengaging pressure.

The third range, which occurs in the decreasing steering lever operation, has an initial portion wherein the brake hydraulic pressure changes from a brake completely engaging pressure to a maximum value of a brake engagement maintaining pressure while the clutch hydraulic pressure is a clutch completely disengaging pressure, and a subsequent portion wherein the brake hydraulic pressure is the maximum value of a brake engagement maintaining pressure while the clutch hydraulic pressure is a clutch completely disengaging pressure.

The fourth range, which occurs in the decreasing steering lever operation, has an initial portion wherein the clutch hydraulic pressure changes from a clutch completely disengaged pressure to a clutch preparation pressure and the brake hydraulic pressure changes from a maximum value for a brake engagement maintaining pressure to a brake completely disengaging pressure, and a subsequent portion wherein the clutch hydraulic pressure changes from the clutch preparation pressure to a clutch completely engaging pressure while the brake hydraulic pressure is a completely disengaging pressure.

The first range, which occurs in the increasing steering lever operation, and the third range, which occurs in the decreasing steering lever operation, overlap and the degree of the overlap is adjustable.

In the above-described structure of the invention, the timing of the engagement of the clutch and the timing of the engagement of the brake are adjusted to prevent generation of shocks during the steering operation.

In the changes with time of the steering control signals outputted from the controller to the electrically actuated control valves, it is desirable that each of the braking preparation pressure of the second range of the increasing steering lever operation and the clutch preparation pressure of the fourth range of the decreasing steering lever operation first rises to a predetermined pressure for a predetermined period of time and then gradually lowers.

Thus, the initiating engagement points of the clutch and the brake are clarified, and the engagement of both the clutch and the brake at the same time is prevented.

In addition, braking is initiated a predetermined period of time after the complete clutch disengagement in the second range of the increasing steering lever operation, and clutch engagement is initiated a predetermined period of time after complete brake disengagement in the fourth range of the decreasing steering lever operation. The predetermined time interval from the complete clutch disengagement to the initiation of the braking in the second range or from the complete brake disengagement to the initiation of the clutch engagement in the fourth range is adjustable in accordance with operation conditions.

In the above-described structure of the invention, when the operating speed of the steering lever is slow, the predetermined time interval can be reduced to improve the fine controllability. When the operation speed of the steering lever is high, the predetermined time interval can be increased to prevent generation of shocks due to the simultaneous coupling and thereby provide a vehicle which is comfortable for the operator to ride.

In another aspect of the present invention, there is provided an electrical steering control system for a tracked vehicle which includes a steering lever, a right clutch and a right brake on a right driving shaft, and a left clutch and a left brake on a left driving shaft. The steering control system further includes electrically actuated control valves for separately controlling the left and right clutches and the left and right brakes, an inclination angle detector for detecting an inclination angle of the vehicle in a longitudinal direction thereof, and a controller for receiving a signal from the steering lever and a signal from the inclination angle detector and for outputting control signals to the electrically actuated control valves. The time interval from the disengagement of the clutch to the initiation of the braking and the time interval from the disengagement of the brake to the initiation of the engagement of the clutch can be controlled on the basis of the inclination angle of the vehicle in the longitudinal direction thereof.

In the above-described structure of the invention, when the inclination angle is small, a plus time interval is provided to prevent generation of shocks. When the inclination angle is large, a minus time interval is provided to prevent generation of the reverse steering phenomenon.

BRIEF DESCRIPTION OF THE DRAWINGS

FIG. 3 shows the relation between the stroke of a steering lever and each of the clutch engagement maintaining pressure and the brake engagement maintaining pressure;

DETAILED DESCRIPTION OF THE PREFERRED EMBODIMENTS

Figure 1:
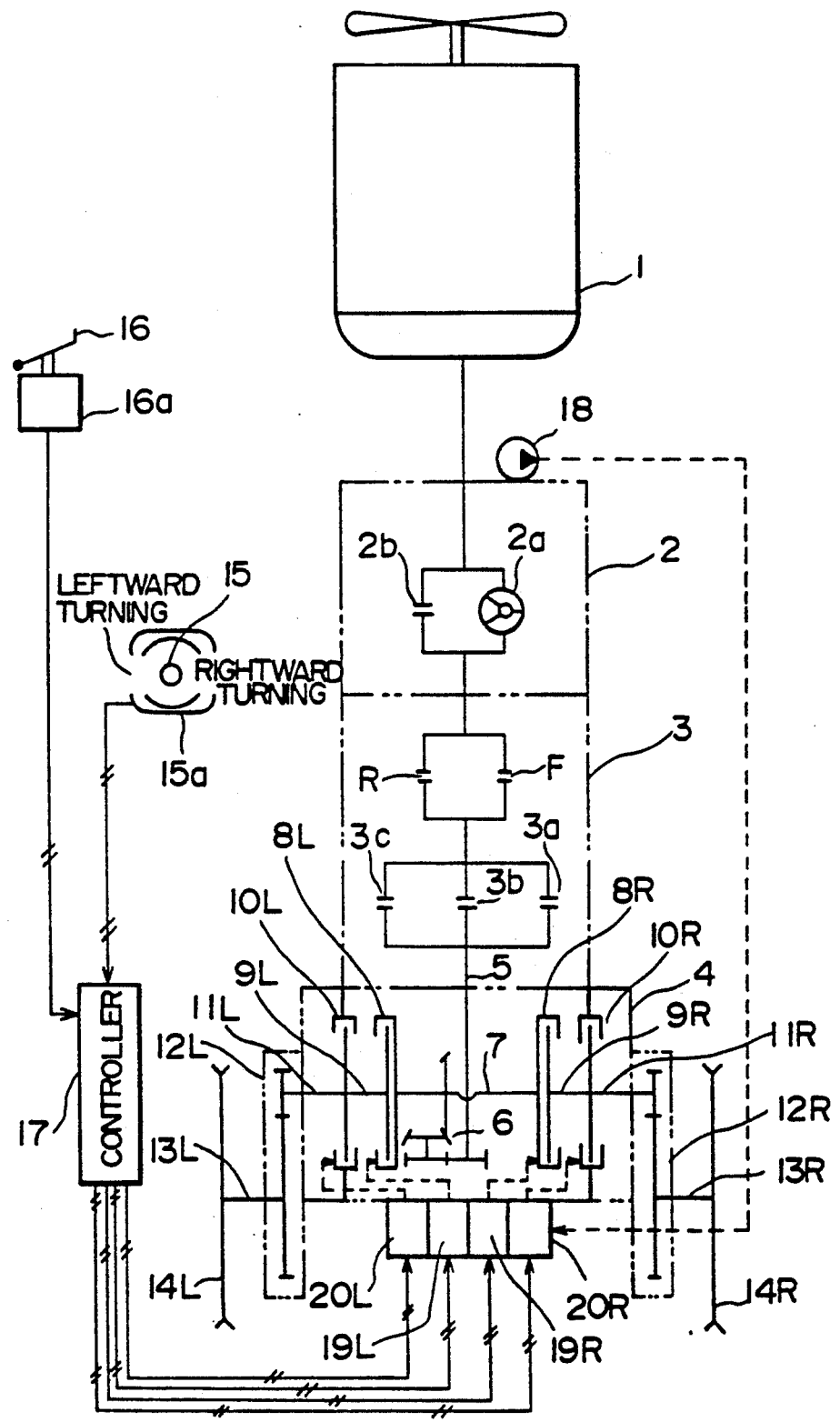
FIG. 1 is a schematic view of a first embodiment of an electrical steering control system according to the present invention.

A first embodiment of the present invention is described below with reference to FIG. 1, which is a schematic view of an electrical steering control system for a tracked vehicle, e.g., bulldozer. In FIG. 1, identical reference numerals to those in FIGS. 10 through 13 represent similar or identical elements, and the description thereof with respect to FIG. 1 is omitted.

In FIG. 1, reference numeral 15 denotes a single steering lever, and reference number 15a denotes a steering signal generator which provides a steering signal representative of the desired direction of turning and the magnitude of the movement of the steering lever from its neutral position. One suitable steering signal generator for use with a single steering lever includes a potentiometer which provides, for example, 3 volts as a neutral position, a range of 3.01 volts to 4 volts to indicate a right turn operation, and a range of 2 volts to 2.99 volts to indicate a left turn operation. Thus, a voltage greater than 3 volts would indicate that the desired direction of turning is to the right, while the magnitude by which the voltage is greater than 3 volts would indicate the magnitude of the movement of the steering lever from its neutral position. An increasing voltage which is greater than 3 volts would indicate an increasing steering signal operation, while a decreasing voltage which is greater than 3 volts would indicate a decreasing steering lever operation. The rate of change of the voltage with time would indicate the speed of the movement of the steering lever.

Reference numeral 16 in FIG. 1 denotes a brake pedal; 16a denotes a brake signal generator; 17 denotes a controller to which is inputted the steering signal from the steering signal generator 15a and a brake signal from the brake signal generator 16a; 18 denotes a control pump; 19R and 19L denote electrically actuated control valves for controlling the hydraulic pressure for the right and left clutches 8R and 8L, respectively, on the basis of a respective steering control signal from the controller 17; 20R and 20L denote electrically actuated control valves for controlling the hydraulic pressure for the right and left brakes 10R and 10L, respectively, on the basis of a respective steering control signal from the controller 17.

The operation of the aforementioned structure is described below. The power of the engine 1 is transmitted to the input shaft 5 of the steering unit 4 via the torque converter 2a or the lock-up clutch 2b of the torque converter unit 2, then the forward clutch F or the reverse clutch R, and then a speed gear clutch 3a, 3b or 3c. The power of the engine 1, which has been transmitted to the input shaft 5, is then transmitted to the horizontal input shaft 7 through the speed change gear mechanism 6.

During the time when neither the steering lever 15 nor the brake pedal 16 is moved from its neutral position during the running of the vehicle, no control signal is outputted from the controller 17 to the electrically actuated control valves 19R, 19L, 20R and 20L, which would require a change from the neutral conditions, with the result that the right and left clutches 8R and 8L are completely engaged while the right and left brakes 10R and 10L are completely disengaged. Accordingly, the power of the engine 1, which is transmitted to the horizontal input shaft 7 of the steering unit 4, is further transmitted to the right and left drive sprockets 14R and 14L in the same direction and at the same rotational speed via the right and left intermediate shafts 9R and 9L, the right and left output shafts 11R and 11L, the right and left last reduction gears 12R and 12L, and then the right and left output shafts 13R and 13L, to make the vehicle travel straight, whether forwardly or backwardly as mandated by the operator's actuation of the forward clutch F or the reverse clutch R.

When the steering lever 15 is moved from its neutral position in the rightward turning direction while the vehicle is running, the steering signal generator 15a transmits to the controller 17 a steering signal indicating that a right turn is desired with the magnitude of the steering signal corresponding to the amount of operation of the steering lever 15 and an increasing steering signal indicating an increasing steering lever operation. In turn, the controller 17 transmits a steering control signal to the electrically actuated control valve 19R to generate a clutch hydraulic pressure for the right clutch 8R which changes with time in the manner shown in FIG. 4 and/or a control signal to the electrically actuated Control valve 20R to generate a brake hydraulic pressure for the right brake 10R which changes with time in the manner shown in FIG. 4. Consequently, the right clutch hydraulic pressure increases in response to the amount of operation of the steering lever 15 from its neutral position toward the right turn full stroke position. The braking is initiated a predetermined period of time after the clutch has been disengaged. The predetermined period of time interval is determined with the operation conditions, such as the inclination angle of the vehicle body, the working oil temperature, or the rate of movement of the steering lever 14, being taken into consideration. As the braking power of the brake gradually increases thereafter with further movement of the steering lever from its neutral position toward the right turn full stroke position, the power transmitted from the engine 1 to the right drive sprocket 14R gradually decreases, reducing the rotational speed of the drive sprocket 14R. Thus, the vehicle turns to the right due to the smooth steering modulation characteristics, which are free from shock. In addition, the reverse steering phenomenon can be prevented.

When the steering lever 15 is operated to the right from its neutral position to an intermediate position in the increasing steering lever operation mode, e.g., past the midway point toward but short of the full stroke position, the right clutch hydraulic pressure is initially increased from a clutch completely engaging pressure to a clutch engagement maintaining pressure, the increasing magnitude of which corresponds to the increasing amount of the steering lever stroke from its neutral position, as shown by the upwardly sloping clutch pressure line in FIG. 3, while the right brake hydraulic pressure is initially maintained at a brake completely disengaging pressure. Then, the right clutch hydraulic pressure is subsequently increased to and maintained at a clutch completely disengaging pressure, while the right brake hydraulic pressure is lowered to a brake engagement maintaining pressure, the decreasing magnitude of which corresponds to the amount of the increasing steering lever stroke from its neutral position, as shown by the downwardly sloping brake pressure line in FIG. 3. Consequently, during the period of the delay time between the disengagement of the clutch and the engagement of the brake, both of the clutch 8R and the brake 10R are disengaged, while during the remainder of the movement to the intermediate position one of the clutch 8R and the brake 10R is completely disengaged while the other is partially engaged, thereby resulting in the vehicle turning to the right throughout the movement of the steering lever to the right from its neutral position to the intermediate position.

Figure 4:
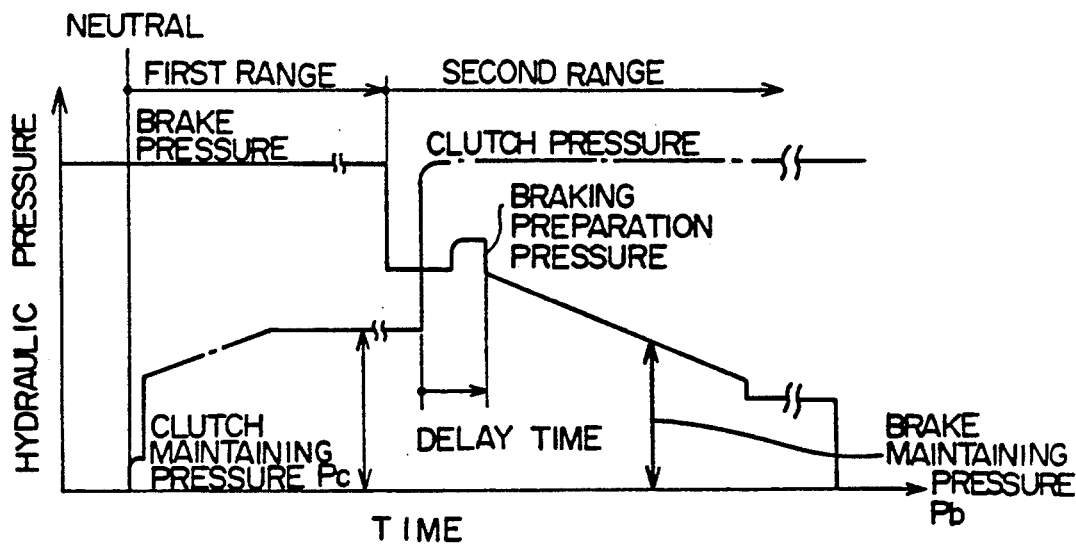
FIG. 4 shows changes with time of the clutch or brake hydraulic pressure when the amount of operation of the steering lever increases.
Figure 5:
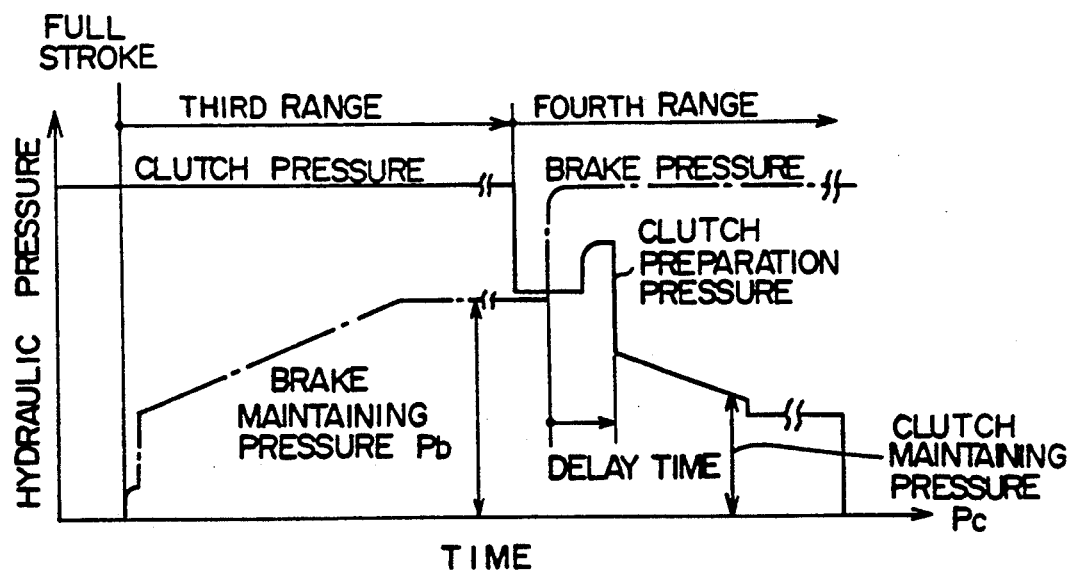
FIG. 5 shows changes with time of the clutch or brake hydraulic pressure when the amount of operation of the steering lever decreases.

When the steering lever 15, which has been fully operated to the right, is returned to its neutral position during the turning of the vehicle to the right, the controller 17 transmits a steering control signal to the electrically actuated control valve 19R to generate a clutch hydraulic pressure for right clutch 8R, the magnitude of which changes with time in the manner shown in FIG. 5, and/or a steering control signal to the electrically actuated control valve 20R to generate a brake hydraulic pressure for right brake 10R, the magnitude of which changes with time in the manner shown in FIG. 5. It should be noted that while the amount of the stroke of the steering lever 15 from its neutral position increases with increasing time in FIG. 4, the amount of the stroke of the steering lever 15 from its neutral position decreases with increasing time in FIG. 5. Consequently, the right brake hydraulic pressure increases from a completely engaged brake pressure to a brake engagement maintaining pressure in response to the decreasing stroke of the steering lever 15, from its neutral position, in the initial portion of the third range; and the clutch 8R starts being engaged a predetermined period of time after the right brake 10R has been disengaged in the fourth range. The predetermined period of time, between the complete disengagement of the brake and the start of the engagement of the clutch, is determined with the operation conditions, such as the inclination angle of the vehicle, the working oil temperature, and/or the rate of movement of the steering lever, being taken into consideration. As the degree of the engagement of the clutch 8R gradually increases thereafter with further decreases in the amount of the stroke of the steering lever from its neutral position, the power of the engine 1 is gradually transmitted to the right drive sprocket 14R, gradually increasing the rotational speed of the right drive sprocket 14R. Thus, the vehicle retrieves the straight travelling posture due to the smooth steering modulation characteristics, which are free from shocks. In addition, the reverse steering phenomenon can be prevented.

When the steering lever 15 is operated from its full stroke position to an intermediate position in the decreasing steering lever operation mode, e.g., past the midway point toward but short of the neutral position, the right brake hydraulic pressure is initially increased from a brake completely engaging pressure to a brake engagement maintaining pressure, the increasing magnitude of which corresponds to the decreasing amount of the steering lever stroke from its neutral position, as shown by the upwardly sloping brake pressure line in FIG. 5, while the right clutch hydraulic pressure is initially maintained at a clutch completely disengaging pressure. Then, the right brake hydraulic pressure is subsequently increased to and maintained at a brake completely disengaging pressure, while the right clutch hydraulic pressure is lowered to a clutch engagement maintaining pressure, the decreasing magnitude of which corresponds to the amount of the decreasing steering lever stroke, from its neutral position, as shown by the downwardly sloping clutch pressure line in FIG. 5. Consequently, during the period of the delay time between the disengagement of the brake and the engagement of the clutch, both of the clutch 8R and the brake 10R are disengaged, while during the remainder of the movement to the intermediate position one of the clutch 8R and the brake 10R is completely disengaged while the other is partially engaged, thereby resulting in the vehicle turning to the right throughout the movement of the steering lever from the right full stroke position to the intermediate position.

As the movement of the steering lever 15 to the left through its full stroke and then the return movement of the steering lever 15 from its full stroke to its neutral position are similar to the movement of steering lever 15 to the right through its full stroke and then the return movement of the steering lever 15 from its full stroke to its neutral position, the description of the details thereof is omitted. The movement of the steering lever 15 to the left from the neutral position to an intermediate position is also similar to the movement of the steering lever 15 to the right from the neutral position to an intermediate position, and the movement of the steering lever 15 from the left full stroke position to an intermediate position is also similar to the movement of the steering lever 15 from the right full stroke position to an intermediate position.

The controller 17 will be described below in detail with reference to FIG. 2. The controller 17 is a digital computer, preferably a micro-computer, which has a memory and hardwiring and/or programming to provide digital operation circuits such as a steering mode selector 21, a brake maintaining pressure/build-up ratio setter 22, a steering control signal generator 23, a braking mode selector 24, a brake maintaining pressure/- build-up ratio setter 25, a brake control signal generator 26, and a brake control signal comparator 27.

When a steering signal is inputted from the steering signal generator 15a of the steering lever 15 to the controller 17, the memory of the digital computer stores an indication of the turn direction desired, which is subsequently used to select the appropriate clutch control valve 19R or 19L and the appropriate brake control valve 20R or 20L. When a steering signal is inputted from the steering signal generator 15a of the steering lever 15 to the steering mode selector 21 in the controller 17, the steering mode selector 21 selects the steering mode on the amount of the stroke of the steering lever 15 from its neutral position, and whether it is an increasing steering lever operation or a decreasing steering lever operation. The steering mode selector 21 outputs the amount of the stroke of the steering lever 15 and the operation speed signal (representative of the speed of the stroking operation) to the maintaining pressure/build-up ratio setter 22 and outputs the selected steering mode to the steering control signal generator 23. The steering control signal generator 23 utilizes the selected steering mode and stored relationships of electrical current and time for clutch pressure control in each steering mode to output a clutch control signal Ic to the clutch electrically actuated proportional control valve 20R or 20L, which supplies to the clutch 8R or 8L, respectively, a controlling hydraulic pressure which is proportional to the clutch control signal Ic. Similarly, the steering control signal generator 23 utilizes the selected steering mode and stored relationships of electrical current and time for brake pressure control in each steering mode to output a brake control signal Ib1.

Figure 2:
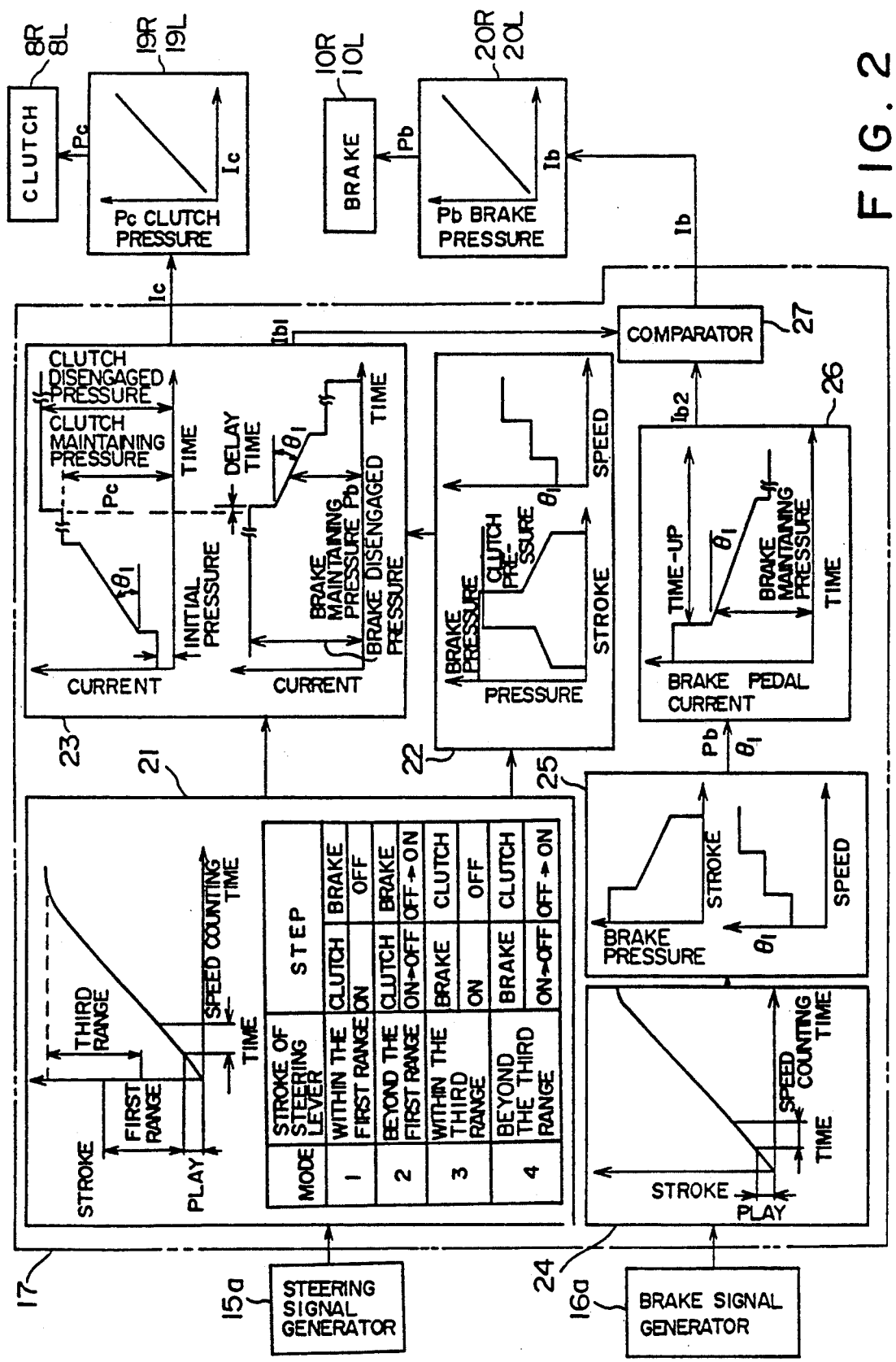
FIG. 2 shows details of the controller of FIG. 1.

The changes with time in the steering control signals, indicated in the steering control signal generator 23 in FIG. 2, are the same as those shown in FIG. 4 in the modes 1 and 2 of the steering mode selector 21, and are the same as those shown in FIG. 5 in the modes 3 and 4 of the steering mode selector 21. The build-up ratio $\theta1$ of the steering control signal indicated in the steering control signal generator 23 for the brakes 10R, 10L and the build-up ratio $\theta1$ of the steering control signal indicated in the steering control signal generator 23 for the clutches 8R and 8L can, but do not have to, be the same.

When the brake pedal 16 is operated during the steering control operation, the brake signal generator 16a outputs a brake signal, the magnitude of which corresponds to the amount of operation of the brake pedal 16, to the braking mode selector 24 of the controller 17. The braking mode selector 24 outputs both the stroke and the operation speed (rate of movement) of the brake pedal 16 to the brake maintaining pressure/build-up ratio setter 25, and the maintaining pressure/build-up ratio setter 25 outputs a brake engagement maintaining pressure signal Pb and a build-up ratio signal $\theta1$ to the brake control signal generator 26, which in turn outputs a brake pedal current signal Ib2 to the brake control signal comparator 27.

The build-up ratio $\theta1$ outputted from the setter 25 can, but does have to, be the same as the build-up ratio $\theta1$ of the brakes 10R, 10L or the build-up ratio $\theta1$ of the clutches 8R, 8L, indicated in the steering control signal generator 23.

The brake control signal Ib1 generated from the steering control signal generator 23 is also outputted to the brake control signal comparator 27. As the larger control signal of the brake control signals inputted to the comparator 27 is outputted to the electrically actuated proportional control valve 20R or 20L, depending upon the indicated direction of the desired turn, the appropriate electrically actuated proportional control valve 20R or 20L supplies a controlling hydraulic pressure, which is proportional to the brake control signal Ib, to the appropriate brake 10R or 10L.

FIG. 3 shows the relation between the stroke of the steering lever 15 and the values of each of the clutch pressure and the brake pressure in FIG. 2. When the amount of operation of the steering lever 15 increases from the neutral position to the full stroke position, a range from the zero stroke position to stroke position c is set to be a neutral range, a range from stroke position c to stroke position b is set to be the first range, and a range from stroke position b to the full stroke position is set to the second range. When the amount of operation of the steering lever 15 decreases from the full stroke position, a range from the full stroke position to stroke position a is set to the third range, a range from stroke position a to stroke position e is set to the fourth range, and a range from stroke position: to the zero stroke position is set to be a neutral range. As the steering lever 15 is operated past stroke position: in the increasing steering lever operation, the clutch 8R or 8L located on the side of the vehicle to which the vehicle is steered starts being disengaged. After the clutch 8R or 8L has been completely disengaged at stroke position a in the increasing steering lever operation, the corresponding brake 10R or 10L starts being engaged at stroke position b, thereby reducing the speed of the drive sprocket, 14R or 14L located on the side of the vehicle to which the vehicle is steered, in accordance with the stroke of the steering lever 15 in the increasing steering lever operation. Consequently, the vehicle can be steered at a turning radius corresponding to the length of the stroke movement of the steering lever 15.

According to the above-described first embodiment, fine control of the steering lever 15 is not necessary, and smooth steering characteristics can be obtained under any driving condition by the normal steering operation. Thus, the steering operability of the operator can be improved. In addition, since there is no shock which would be generated when the clutch and brake are engaged, the comfortable riding can be obtained, and the durability of the device is improved.

A second embodiment of the present invention will be described below with reference to the accompanying drawings.

Figure 6:
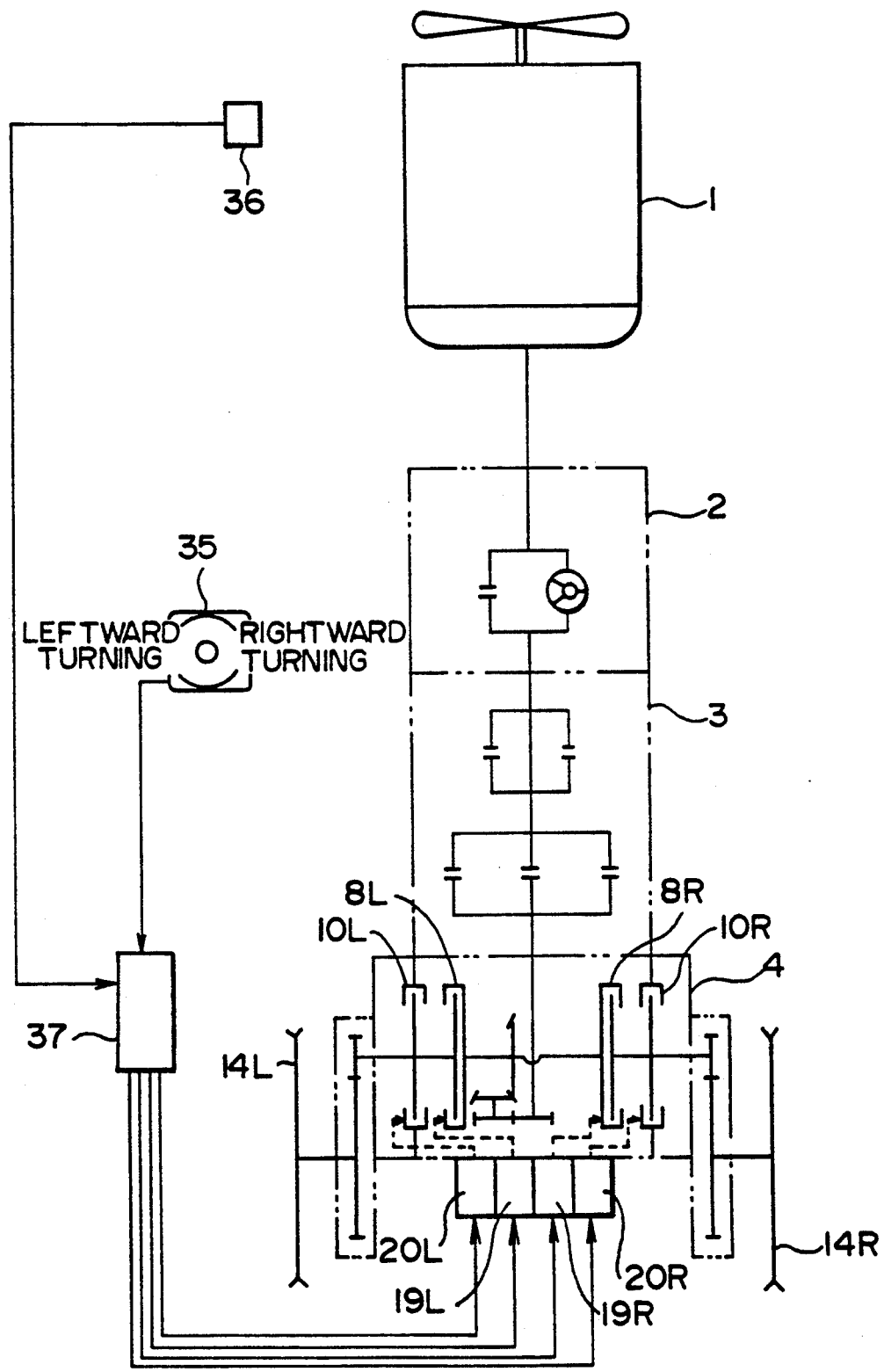
FIG. 6 is a schematic view of a second embodiment of the electrical steering control device according to the present invention.

FIG. 6 shows the structure of the second embodiment of the steering control device according to the present invention. As identical reference numerals in FIG. 6 to those in FIG. 1 represent similar or identical elements, the description thereof for FIG. 6 is omitted. Reference numeral 36 is an inclination angle detector for detecting an inclination angle in the longitudinal direction of the vehicle; 35 is a steering lever; 37 is a digital computer controller which is connected to the inclination angle detector 36, to the steering lever 35 and to the electrically actuated control valves 19R, 19L, 20R and 20L.

The control method of the structure shown in FIG. 6 is described below. When the steering lever 35 is pushed to the right during the running of the vehicle, the controller 37 receives a signal and transmits a control signal to the right electrically actuated control valve 19R and/or the right electrically actuated control valve 20R. The electrically actuated control valve 19R feeds the hydraulic oil to the right clutch 8R to turn it off, while the electrically actuated control valve 20R feeds the hydraulic oil to the right brake 10R to turn it on. Consequently, the rotation of the right drive sprocket 14R stops, thereby stopping the right crawler track and making the vehicle turn to the right. As the steering lever 35 is returned to its original position, the controller 37 transmits a control signal to the right clutch 8R to turn it on and a control signal to the right brake 10R to turn it off, and thereby makes the vehicle run straight ahead. The controller 37 receives the signal from the inclination angle detector 36, and adjusts the time interval (delay time) from the turning off of the right clutch 8R to the turning on of the right brake 10R in the increasing steering lever operation or the time interval (delay time) from the turning off of the right brake 10R to the turning on of the right clutch 8R in the decreasing steering lever operation, on the basis of the magnitude of the inclination angle of the vehicle in the longitudinal direction of the vehicle.

Figure 7:
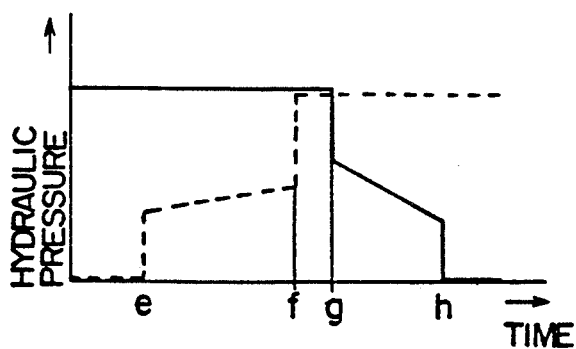
FIG. 7 shows the clutch and brake modulation characteristics when the vehicle is running on a flat site.
Figure 8:
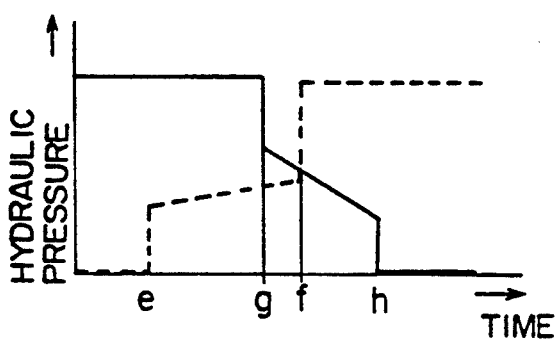
FIG. 8 shows the clutch and brake modulation characteristics when the vehicle is running on an inclined site.

FIGS. 7 and 8 show the modulation characteristics when the clutch 8R, 8L is turned off (disengaged) and the brake 10R, 10L is turned on (engaged). The ordinate axis represents the hydraulic pressure of the working oil, and the abscissa axis represents the time during the operation of the steering lever from its neutral position. The broken lines indicate the operation of the clutch 8R, 8L, and the solid lines indicate the operation of the brake 10R, 10L. Both of the clutches 8R, 8L are of the type which contains a spring and which is turned off (disengaged) when the hydraulic pressure supplied thereto exceeds a first predetermined value and is turned on (engaged) when the hydraulic pressure supplied thereto is below a second predetermined value, which is less than the first predetermined value. Both of the brakes 10R, 10L are of the type which contains a spring and which is turned off (disengaged) when the hydraulic pressure supplied thereto exceeds a third predetermined value and is turned on (engaged) when the hydraulic pressure supplied thereto is below a fourth predetermined value, which is less than the third predetermined pressure. Alternatively, other types of clutches and brakes can be employed.

FIG. 7 shows the modulation characteristics when the inclination angle is small, e.g., when the vehicle is running on a relatively flat horizontal site. At the beginning, the clutches 8R and 8L are on (engaged) with no hydraulic oil being fed thereto, while the brakes 10R and 10L are off (disengaged) with a hydraulic oil being fed thereto. The vehicle is running straight ahead. When the steering lever 35 is operated, the controller 37 receives the signal from the inclination angle detector 36 and transmits control signals to the electrically actuated control valves 19R, 19L, 20R, 20L, i.e., the controller 37 feeds a hydraulic oil to the appropriate clutch 8R or 8L at a point e to increase the hydraulic pressure thereof and thereby gradually reduce the engaging force along the broken line in FIG. 7 representing the clutch operation, and then completely disengages the clutch 8R or 8L at a point f. Next, at a later point g, the controller 37 returns a portion of the hydraulic oil of the appropriate brake 10R or 10L to reduce the hydraulic pressure thereof to initiate braking and then gradually increase the braking force along the solid line in FIG. 7 representing the brake operation, until the brake 10R or 10L is fully engaged at a point h. Thus, there is a plus delay time between points f and g, and the engagement of the brake 10R or 10L is initiated only after the corresponding clutch 8R or 8L has been disengaged. Similarly, in the decreasing steering lever operation, the engagement of the clutch 8R or 8L is initiated only after the corresponding brake 10R or 10L has been completely disengaged, and generation of a shock can be eliminated.

FIG. 8 shows the modulation characteristics when the inclination angle is large, e.g., when the vehicle is running on a site which is significantly inclined to the horizontal. When the steering lever 35 is operated, the controller 37 receives a signal from the inclination angle detector 36 and transmits a control signal to the electrically actuated control valves 19R, 19L, 20R, 20L, i.e., the controller 37 returns a portion of the hydraulic oil of the appropriate brake 10R or 10L at a point g to reduce the hydraulic pressure thereof and thereby initiating braking and then gradually increase the braking force along the solid line in FIG. 8 representing the brake operation, until the brake 10R or 10L is fully engaged at a point h. Also, the controller 37 feeds a hydraulic oil to the appropriate clutch 8R or 8L at a point e to increase the hydraulic pressure thereof and thereby gradually reduce the clutch engaging force along the broken line in FIG. 8 representing the clutch operation, and then completely disengages the clutch 8R or 8L at a point f. At that time, a minus delay time has been provided between points f and g. Thus, when the hydraulic pressure of the clutch 8R or 8L is increased, the clutch 8R or 8L maintains the engaging force which ensures that it prevents falling of the vehicle by its own weight at an inclined site between points g and f. When the hydraulic pressure of the clutch 8R or 8L rises at point f to cause complete disengagement of the clutch, the corresponding brake 10R or 10L is already partially engaged and maintains a braking force which ensures that it prevents falling of the vehicle by its own weight. In other words, the brake 10R or 10L is partially engaged before the corresponding clutch 8R or 8L has been completely disengaged. Similarly, in the decreasing steering lever operation, the clutch 8R or 8L is partially engaged before the corresponding brake 10R or 10L has been completely disengaged. As a result, the occurrence of the reverse steering phenomenon on the vehicle, which is being steered when it is running on the inclined site, can be prevented.

Figure 9:
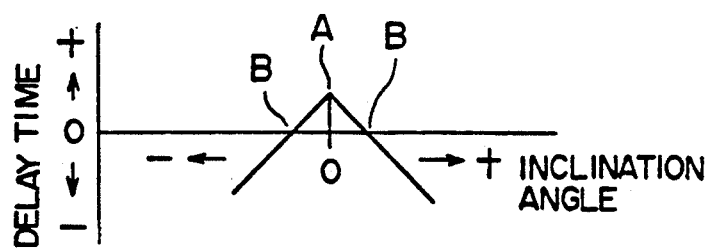
FIG. 9 shows the delay time characteristics when the clutch and brake are operated.
Figure 10:
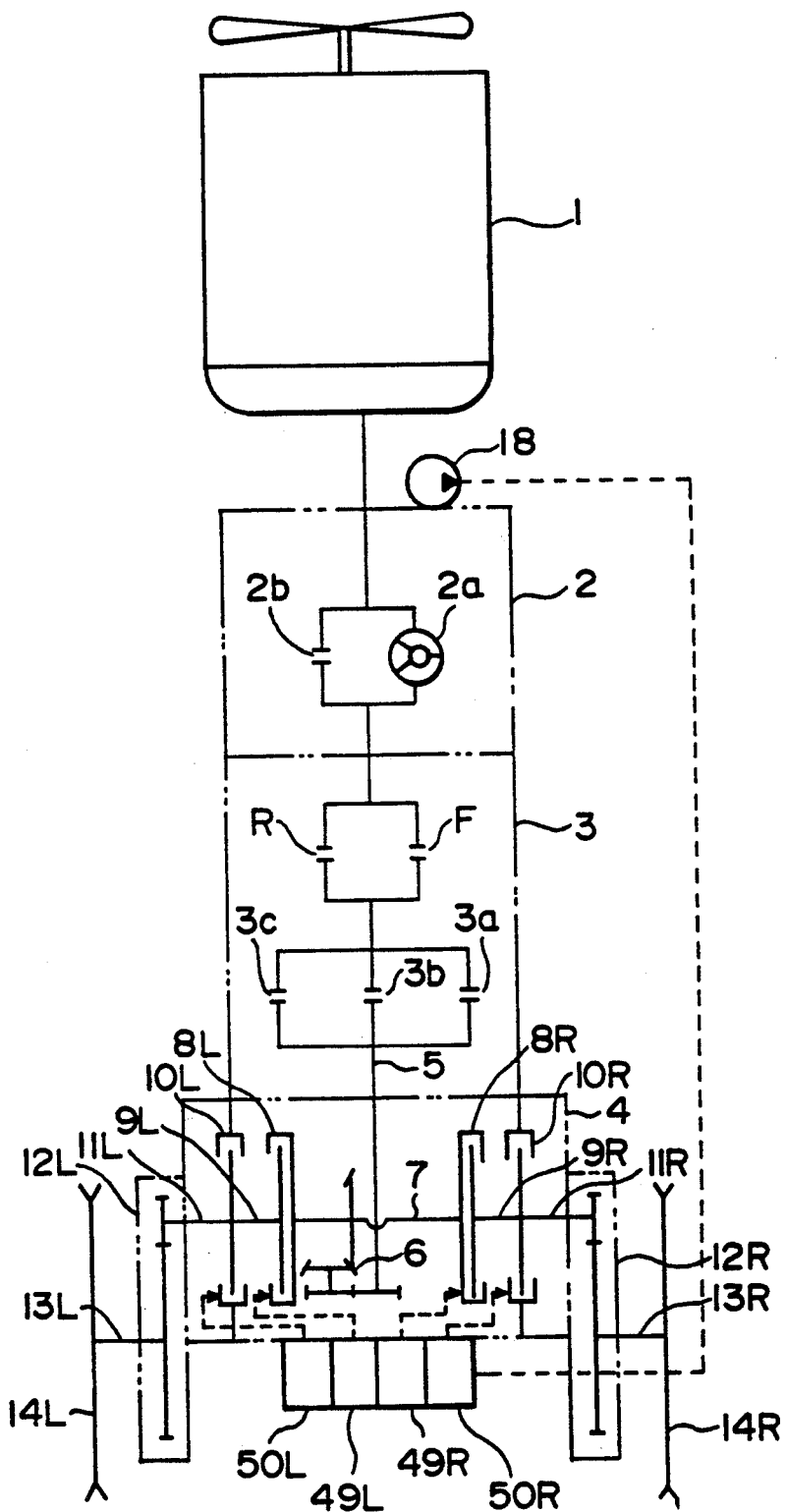
FIG. 10 is a schematic view of a conventional steering control device.
Figure 11:
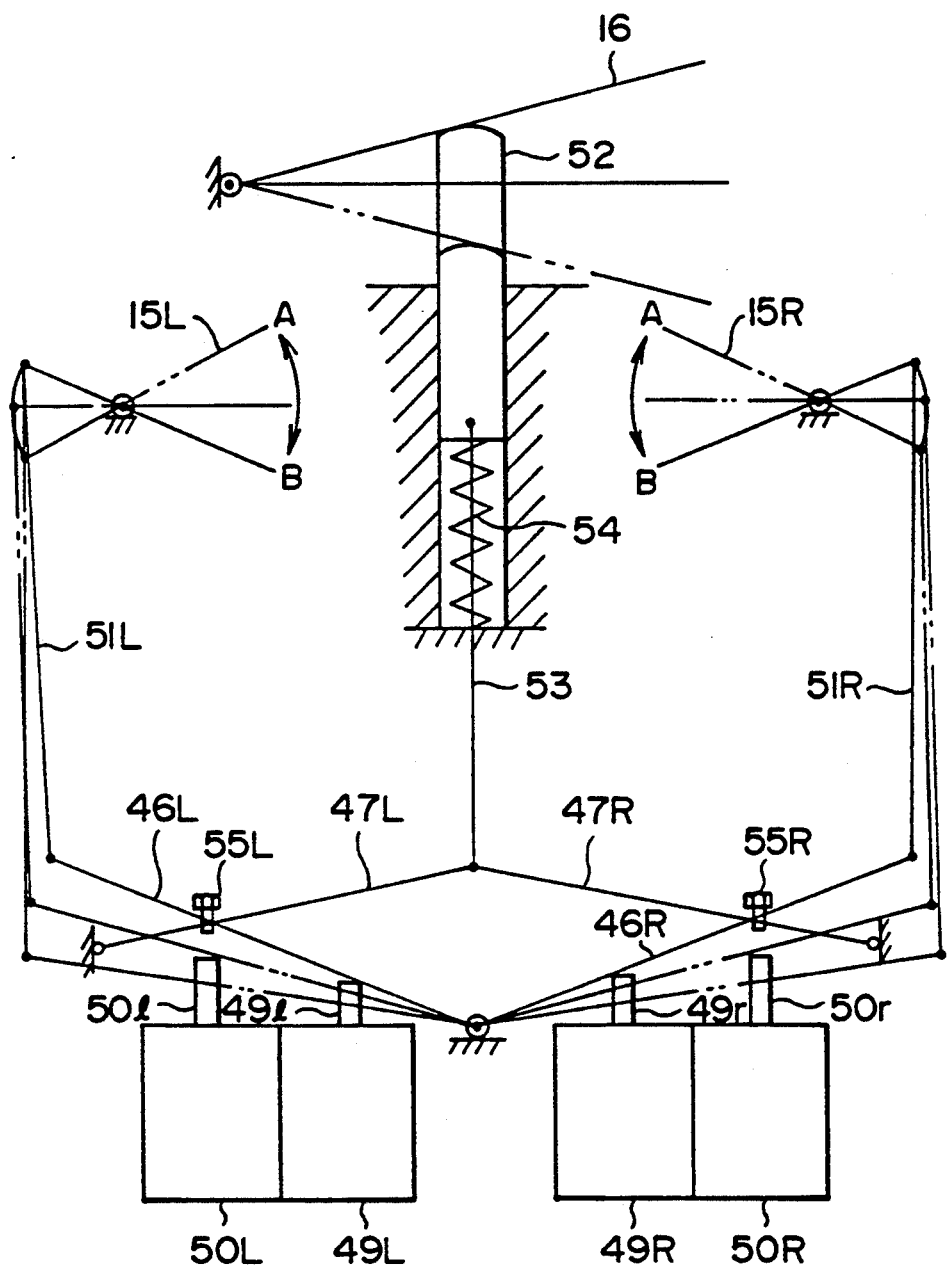
FIG. 11 schematically shows the conventional steering operation.
Figure 12:
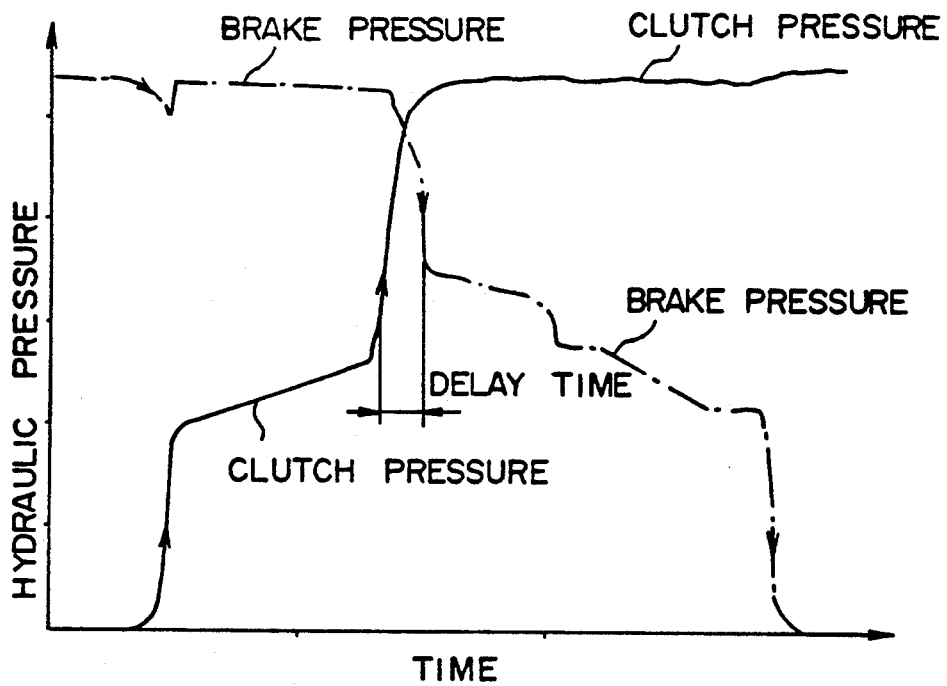
FIG. 12 shows the clutch or brake hydraulic pressure characteristics when the steering lever is operated slowly in the conventional steering control device.
Figure 13:
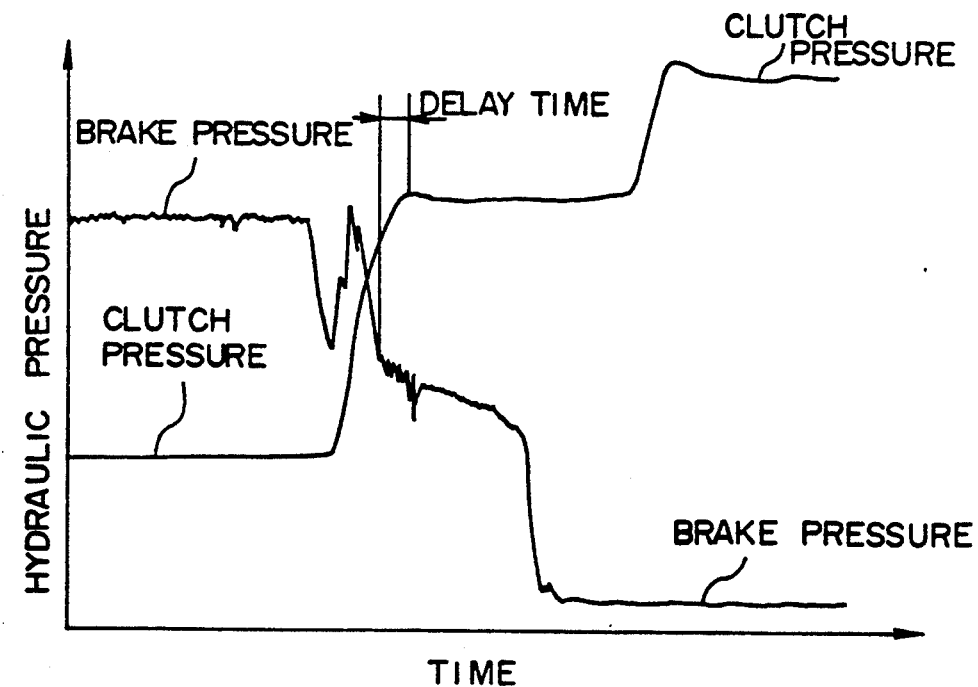
FIG. 13 shows the clutch or brake hydraulic pressure characteristics when the steering lever is operated rapidly in the conventional steering control device.

The length and direction of the delay time is set in accordance with the inclined angle of the vehicle in the longitudinal direction of the vehicle, taken with respect to the horizontal. FIG. 9 shows the delay time characteristics. The ordinate axis represents the delay time, and the abscissa axis represents the inclined angle. The delay time has the maximum plus value A when the inclined angle is zero, and is reduced to zero at the point B of positive inclined angles (increasing inclination) and at point B of negative inclined angles (decreasing inclination). After the inclined angle exceeds the value at either point B, the delay time has a minus value. The absolute value of the minus value increases in proportion to the inclined angle. The minus delay time value is determined in accordance with the inclined angle such that it does not generate the reverse steering phenomenon.

According to the second embodiment of the present invention, generation of shocks and the reverse steering phenomenon can be eliminated, and a vehicle which is comfortable to ride can be provided.

Reasonable variations and modifications are possible within the scope of the foregoing description, the drawings and the appended claims to the invention. For example, while the steering lever 15 is illustrated in FIG. 1 as a single lever with a single controller 17, a left track steering lever and a left controller can be utilized to control the left brake and the left clutch while a right track steering lever and a right controller can be utilized to control the right brake and the right clutch. Similarly, a left track steering lever and a right track steering lever can supply steering signals to a single controller, which in turn separately controls each of the left and right clutches and the left and right brakes. While FIG. 1 shows a single engine 1, a left drive engine and a right drive engine can be provided to separately power the left and right crawler tracks. The inclination angle detector preferably measures the angle of inclination with respect to the horizontal, but can make the measurement with respect to the vertical.

What is claimed is:

1. A steering control system for a tracked vehicle having a left drive sprocket and a right drive sprocket, wherein power of an engine is transmitted to said right drive sprocket by a right driving shaft which is coupled to an output shaft via a right clutch and a right brake, and power of an engine is transmitted to the left drive sprocket by a left driving shaft which is coupled to an output shaft via a left clutch and a left brake, said system comprising:

control valves for separately controlling hydraulic pressure to said right clutch, said left clutch, said right brake, and said left brake;

a steering lever which is movable between a neutral position and a full stroke position;

a steering signal generator for generating a steering signal corresponding to the amount of movement of said steering lever from said neutral position; and a controller for receiving the steering signal from said steering signal generator and for outputting steering control signals to the control valve for one of said clutches and to the control valve for the brake associated with said one of said clutches;

wherein changes with time of the steering control signals outputted from said controller to the control valve of said one of said clutches and to the control valve of the brake associated therewith, when the amount of operation of said steering lever increases from its neutral position to its full stroke position, include:

(a) a first range in which the clutch hydraulic pressure changes from a clutch completely engaging pressure to a clutch engagement maintaining pressure corresponding to the stroke position of said steering lever, while the brake hydraulic pressure is a brake completely disengaging pressure, and (b) a second range in which the clutch hydraulic pressure changes from the clutch engagement maintaining pressure to a clutch completely disengaging pressure while the brake hydraulic pressure changes from a braking preparation pressure, which is slightly higher than an initiating brake engagement pressure, to a brake completely engaging pressure;

wherein the changes with time of the steering control signals outputted from said controller to the control valve of said one of said clutches and to the control valve of the brake associated therewith, when the amount of operation of said steering lever decreases from its full stroke to its neutral position, include:

(c) a third range in which the brake hydraulic pressure changes from a brake completely engaging pressure to a brake engagement maintaining pressure corresponding to the stroke of said steering lever, with the clutch hydraulic pressure being the clutch completely disengaging pressure, and (d) a fourth range in which the brake hydraulic pressure changes from the brake engagement maintaining pressure to the brake completely disengaging pressure while the clutch hydraulic pressure changes from a clutch preparation pressure, which is slightly higher than a clutch engagement initiating pressure, to the clutch completely engaging pressure; and wherein said first range and said third range overlap, and the degree of overlap is adjustable.

2. A steering control system for a tracked vehicle having a left drive sprocket and a right drive sprocket, wherein power of an engine is transmitted to said right drive sprocket by a right driving shaft which is coupled to an output shaft via a right clutch and a right brake, and power of an engine is transmitted to the left drive sprocket by a left driving shaft which is coupled to an output shaft via a left clutch and a left brake, said system comprising:

control valves for separately controlling hydraulic pressure to said right clutch, said left clutch, said right brake, and said left brake;

a steering lever which is movable between a neutral position and a full stroke position;

a steering signal generator for generating a steering signal corresponding to the amount of movement of said steering lever from said neutral position; and a controller for receiving the steering signal from said steering signal generator and for outputting steering control signals to the control valve for one of said clutches and to the control valve for the brake associated with said one of said clutches;

wherein changes with time of the steering control signals outputted from said controller to the control valve of said one of said clutches and to the control valve of the brake associated therewith, when the amount of operation of said steering lever increases from its neutral position to its full stroke position, include:

(a) a first range in which the clutch hydraulic pressure changes from a clutch completely engaging pressure to a clutch engagement maintaining pressure corresponding to the stroke position of said steering lever, while the brake hydraulic pressure is a brake completely disengaging pressure, and (b) a second range in which the clutch hydraulic pressure changes from the clutch engagement maintaining pressure to a clutch completely disengaging pressure while the brake hydraulic pressure changes from a braking preparation pressure, which is slightly higher than an initiating brake engagement pressure, to a brake completely engaging pressure;

wherein the changes with time of the steering control signals outputted from said controller to the control valve of said one of said clutches and to the control valve of the brake associated therewith, when the amount of operation of said steering lever decreases from its full stroke to its neutral position, include:
  (c) a third range in which the brake hydraulic pressure changes from a brake completely engaging pressure to a brake engagement maintaining pressure corresponding to the stroke of said steering lever, with the clutch hydraulic pressure being the clutch completely disengaging pressure, and
  (d) a fourth range in which the brake hydraulic pressure changes from the brake engagement maintaining pressure to the brake completely disengaging pressure while the clutch hydraulic pressure changes from a clutch preparation pressure, which is slightly higher than a clutch engagement initiating pressure, to the clutch completely engaging pressure; and
wherein said first range has:
  an initial portion wherein the clutch hydraulic pressure changes from a clutch completely engaging pressure to a maximum value of a clutch engagement maintaining pressure while the brake hydraulic pressure is a brake completely disengaging pressure, and
  a subsequent portion wherein the clutch hydraulic pressure remains at the maximum value of a clutch engagement maintaining pressure while the brake hydraulic pressure remains at a brake completely disengaging pressure;
wherein said second range has:
  an initial portion wherein the brake hydraulic pressure changes from the brake completely disengaging pressure to said braking preparation pressure and the clutch hydraulic pressure changes from the maximum value of a clutch engagement maintaining pressure to a clutch completely disengaging pressure, and
  a subsequent portion wherein the brake hydraulic pressure changes from said braking preparation pressure to a brake completely engaging pressure while the clutch hydraulic pressure is a clutch completely disengaging pressure;
wherein said third range has:
  an initial portion wherein the brake hydraulic pressure changes from a brake completely engaging pressure to a maximum value of a brake engagement maintaining pressure while the clutch hydraulic pressure is a clutch completely disengaging pressure, and
  a subsequent portion wherein the brake hydraulic pressure remains at the maximum value of a brake engagement maintaining pressure while the clutch hydraulic pressure remains at a clutch completely disengaging pressure;
wherein said fourth range has:
  an initial portion wherein the clutch hydraulic pressure changes from a clutch completely disengaged pressure to a clutch preparation pressure and the brake hydraulic pressure changes from the maximum value of a brake engagement maintaining pressure to a brake completely disengaging pressure, and
  a subsequent portion wherein the clutch hydraulic pressure changes from said clutch preparation pressure to a clutch completely engaging pressure while the brake hydraulic pressure is a completely disengaging pressure.

3. A steering control system in accordance with claim 2, wherein said steering lever has a full stroke position for rightward turning of the vehicle and a full stroke position for leftward turning of the vehicle; wherein said controller outputs a steering control signal to the control valve for said right clutch and a steering control signal to the control valve for said right brake when said steering lever is moved between said neutral position and said full stroke position for rightward turning; and wherein said controller outputs a steering control signal to the control valve for said left clutch and a steering control signal to the control valve for said left brake when said steering lever is moved between said neutral position and said full stroke position for leftward turning.

4. A steering control system in accordance with claim 3, wherein said first range and said third range overlap, and the degree of overlap is adjustable.

5. A steering control system for a tracked vehicle having a left drive sprocket and a right drive sprocket, wherein power of an engine is transmitted to said right drive sprocket by a right driving shaft which is coupled to an output shaft via a right clutch and a right brake, and power of an engine is transmitted to the left drive sprocket by a left driving shaft which is coupled to an output shaft via a left clutch and a left brake, said system comprising:
  electrically actuated proportional control valves for separately controlling hydraulic pressure to said right clutch, said left clutch, said right brake, and said left brake;
  a steering lever which is movable between a neutral position and a full stroke position;
  a steering signal generator for generating a steering signal corresponding to the amount of movement of said steering lever from said neutral position; and
  a controller for receiving the steering signal from said steering signal generator and for outputting steering control signals to the control valve for one of said clutches and to the control valve for the brake associated with said one of said clutches;
  wherein changes with time of the steering control signals outputted from said controller to the control valve of said one of said clutches and to the control valve of the brake associated therewith, when the amount of operation of said steering lever increases from its neutral position to its full stroke position, include:
    (a) a first range in which the clutch hydraulic pressure changes from a clutch completely engaging pressure to a clutch engagement maintaining pressure corresponding to the stroke position of said steering lever, while the brake hydraulic pressure is a brake completely disengaging pressure, and
    (b) a second range in which the clutch hydraulic pressure changes from the clutch engagement maintaining pressure to a clutch completely disengaging pressure while the brake hydraulic pressure changes from a braking preparation pressure, which is slightly higher than an initiating brake engagement pressure, to a brake completely engaging pressure;
  wherein the changes with time of the steering control signals outputted from said controller to the control valve of said one of said clutches and to the control valve of the brake associated therewith, when the amount of operation of said steering lever decreases from its full stroke to its neutral position, include:

(c) a third range in which the brake hydraulic pressure changes from a brake completely engaging pressure to a brake engagement maintaining pressure corresponding to the stroke of said steering lever, with the clutch hydraulic pressure being the clutch completely disengaging pressure, and (d) a fourth range in which the brake hydraulic pressure changes from the brake engagement maintaining pressure to the brake completely disengaging pressure while the clutch hydraulic pressure changes from a clutch preparation pressure, which is slightly higher than a clutch engagement initiating pressure, to the clutch completely engaging pressure; and wherein, in the changes with time of the steering control signals outputted from said controller to said electrically actuated proportional control valves, each of the braking preparation pressure of the second range and the clutch preparation pressure of the fourth range first rises to a predetermined pressure for a predetermined period of time and then gradually lowers.

6. A steering control system for a tracked vehicle having a left drive sprocket and a right drive sprocket, wherein power of an engine is transmitted to said right drive sprocket by a right driving shaft which is coupled to an output shaft via a right clutch and a right brake, and power of an engine is transmitted to the left drive sprocket by a left driving shaft which is coupled to an output shaft via a left clutch and a left brake, said system comprising:

control valves for separately controlling hydraulic pressure to said right clutch, said left clutch, said right brake, and said left brake;

a steering lever which is movable between a neutral position and a full stroke position;

a steering signal generator for generating a steering signal corresponding to the amount of movement of said steering lever from said neutral position; and a controller for receiving the steering signal from said steering signal generator and for outputting steering control signals to the control valve for one of said clutches and to the control valve for the brake associated with said one of said clutches;

wherein changes with time of the steering control signals outputted from said controller to the control valve of said one of said clutches and to the control valve of the brake associated therewith, when the amount of operation of said steering lever increases from its neutral position to its full stroke position, include:

(a) a first range in which the clutch hydraulic pressure changes from a clutch completely engaging pressure to a clutch engagement maintaining pressure corresponding to the stroke position of said steering lever, while the brake hydraulic pressure is a brake completely disengaging pressure, and (b) a second range in which the clutch hydraulic pressure changes from the clutch engagement maintaining pressure to a clutch completely disengaging pressure while the brake hydraulic pressure changes from a braking preparation pressure, which is slightly higher than an initiating brake engagement pressure, to a brake completely engaging pressure;

wherein the changes with time of the steering control signals outputted from said controller to the control valve of said one of said clutches and to the control valve of the brake associated therewith, when the amount of operation of said steering lever decreases from its full stroke to its neutral position, include:

(c) a third range in which the brake hydraulic pressure changes from a brake completely engaging pressure to a brake engagement maintaining pressure corresponding to the stroke of said steering lever, with the clutch hydraulic pressure being the clutch completely disengaging pressure, and (d) a fourth range in which the brake hydraulic pressure changes from the brake engagement maintaining pressure to the brake completely disengaging pressure while the clutch hydraulic pressure changes from a clutch preparation pressure, which is slightly higher than a clutch engagement initiating pressure, to the clutch completely engaging pressure; and wherein braking is initiated at the end of a first predetermined period of time after a complete clutch disengagement in the second range, and clutch engagement is initiated at the end of a second predetermined period of time after a complete brake disengagement in the fourth range.

7. A steering control system in accordance with claim 6, wherein the first and second predetermined periods of time are adjustable in accordance with operation conditions.

8. A steering control system for a tracked vehicle having a left drive sprocket and a right drive sprocket, wherein power of an engine is transmitted to said right drive sprocket by a right driving shaft which is coupled to an output shaft via a right clutch and a right brake, and power of an engine is transmitted to the left drive sprocket by a left driving shaft which is coupled to an output shaft via a left clutch and a left brake, said system comprising:

control valves for separately controlling hydraulic pressure to said right clutch, said left clutch, said right brake, and said left brake;

a steering lever which is movable between a neutral position and a full stroke position;

a steering signal generator for generating a steering signal corresponding to the amount of movement of said steering lever from said neutral position;

a controller for receiving the steering signal from said steering signal generator and for outputting steering control signals to the control valve for one of said clutches and to the control valve for the brake associated with said one of said clutches; and an inclination angle detector for detecting an angle of inclination of the vehicle in a longitudinal direction of the vehicle and for inputting to said controller an inclination signal responsive to said angle of inclination; and wherein said controller varies said steering control signals responsive to said inclination signal;

wherein changes with time of the steering control signals outputted from said controller to the control valve of said one of said clutches and to the control valve of the brake associated therewith, when the amount of operation of said steering lever increases from its neutral position to its full stroke position, include:

(a) a first range in which the clutch hydraulic pressure changes from a clutch completely engaging pressure to a clutch engagement maintaining pressure corresponding to the stroke position of said steering lever, while the brake hydraulic pressure is a brake completely disengaging pressure, and (b) a second range in which the clutch hydraulic pressure changes from the clutch engagement maintaining pressure to a clutch completely disengaging pressure while the brake hydraulic pressure changes from a braking preparation pressure, which is slightly higher than an initiating brake engagement pressure, to a brake completely engaging pressure;

wherein the changes with time of the steering control signals outputted from said controller to the control valve of said one of said clutches and to the control valve of the brake associated therewith, when the amount of operation of said steering lever decreases from its full stroke to its neutral position, include:

(c) a third range in which the brake hydraulic pressure changes from a brake completely engaging pressure to a brake engagement maintaining pressure corresponding to the stroke of said steering lever, with the clutch hydraulic pressure being the clutch completely disengaging pressure, and (d) a fourth range in which the brake hydraulic pressure changes from the brake engagement maintaining pressure to the brake completely disengaging pressure while the clutch hydraulic pressure changes from a clutch preparation pressure, which is slightly higher than a clutch engagement initiating pressure, to the clutch completely engaging pressure.

9. A steering control system for a tracked vehicle having a left drive sprocket and a right drive sprocket, wherein power of an engine is transmitted to said right drive sprocket by a right driving shaft which is coupled to an output shaft via a right clutch and a right brake, and power of an engine is transmitted to the left drive sprocket by a left driving shaft which is coupled to an output shaft via a left clutch and a left brake, said system comprising:

control valves for separately controlling hydraulic pressure to said right clutch, said left clutch, said right brake, and said left brake;

a steering lever which is movable between a neutral position and a full stroke position;

a steering signal generator for generating a steering signal corresponding to the amount of movement of said steering lever from said neutral position;

a controller for receiving the steering signal from said steering signal generator and for outputting steering control signals to the control valve for one of said clutches and to the control valve for the brake associated with said one of said clutches; and an inclination angle detector for detecting an angle of inclination of the vehicle in a longitudinal direction of the vehicle and for inputting to said controller an inclination signal responsive to said angle of inclination; and wherein said controller varies said steering control signals responsive to said inclination signal.

10. A tracked vehicle comprising an engine, a right drive sprocket, a left drive sprocket, a right driving shaft connected to said right drive sprocket, a left driving shaft connected to said left drive sprocket, an output shaft which receives power from said engine, said right driving shaft being coupled to said output shaft by a right clutch and a right brake, said left driving shaft being coupled to said output shaft by a left clutch and a left brake, and a steering control system; said steering control system comprising:

control valves for separately controlling hydraulic pressure to said right clutch, said left clutch, said right brake, and said left brake;

a steering lever which is movable between a neutral position and a full stroke position;

a steering signal generator for generating a steering signal corresponding to the amount of movement of said steering lever from said neutral position;

a controller for receiving the steering signal from said steering signal generator and for outputting steering control signals to the control valve for one of said clutches and to the control valve for the brake associated with said one of said clutches;

wherein said steering lever has a full stroke position for rightward turning of the vehicle and a full stroke position for leftward turning of the vehicle;

wherein said controller outputs a steering control signal to the control valve for said right clutch and a steering control signal to the control valve for said right brake when said steering lever is moved between the neutral position and said full stroke position for rightward turning;

wherein said controller outputs a steering control signal to the control valve for said left clutch and a steering control signal to the control valve for said left brake when said steering lever is moved between the neutral position and said full stroke position for leftward turning;

wherein changes with time of the steering control signals outputted from said controller to the control valve of said one of said clutches and to the control valve of the brake associated therewith, when the amount of operation of said steering lever increases from its neutral position to its full stroke, include:

(a) a first range in which the clutch hydraulic pressure changes from a clutch completely engaging pressure to a clutch engagement maintaining pressure corresponding to the stroke position of said steering lever, while the brake hydraulic pressure is a brake completely disengaging pressure, and (b) a second range in which the clutch hydraulic pressure changes from the clutch engagement maintaining pressure to a clutch completely disengaging pressure while the brake hydraulic pressure changes from a braking preparation pressure, which is slightly higher than an initiating brake engagement pressure, to a brake completely engaging pressure;

and wherein the changes with time of the steering control signals outputted from said controller to the control valve of said one of said clutches and to the control valve of the brake associated therewith, when the amount of operation of said steering lever decreases from its full stroke to a neutral position, include:
- (c) a third range in which the brake hydraulic pressure changes from a brake completely engaging pressure to a brake engagement maintaining pressure corresponding to the stroke of said steering lever, with the clutch hydraulic pressure being the clutch completely disengaging pressure, and
- (d) a fourth range in which the brake hydraulic pressure changes from the brake engagement maintaining pressure to the brake completely disengaging pressure while the clutch hydraulic pressure changes from a clutch preparation pressure, which is slightly higher than a clutch engagement initiating pressure, to the clutch completely engaging pressure;

wherein said first range has:
- an initial portion wherein the clutch hydraulic pressure changes from a clutch completely engaging pressure to a maximum value of a clutch engagement maintaining pressure while the brake hydraulic pressure is a brake completely disengaging pressure, and
- a subsequent portion wherein the clutch hydraulic pressure remains at the maximum value of a clutch engagement maintaining pressure while the brake hydraulic pressure remains at a brake completely disengaging pressure;

wherein said second range has:
- an initial portion wherein the brake hydraulic pressure changes from the brake completely disengaging pressure to said braking preparation pressure and the clutch hydraulic pressure changes from the maximum value of a clutch engagement maintaining pressure to a clutch completely disengaging pressure; and
- a subsequent portion wherein the brake hydraulic pressure changes from said braking preparation pressure to a brake completely engaging pressure while the clutch hydraulic pressure is a clutch completely disengaging pressure;

wherein said third range has:
- an initial portion wherein the brake hydraulic pressure changes from a brake completely engaging pressure to a maximum value of a brake engagement maintaining pressure while the clutch hydraulic pressure is a clutch completely disengaging pressure, and
- a subsequent portion wherein the brake hydraulic pressure remains at the maximum value of a brake engagement maintaining pressure while the clutch hydraulic pressure remains at a clutch completely disengaging pressure;

wherein said fourth range has:
- an initial portion wherein the clutch hydraulic pressure changes from a clutch completely disengaged pressure to a clutch preparation pressure and the brake hydraulic pressure changes from the maximum value of a brake engagement maintaining pressure to a brake completely disengaging pressure, and
- a subsequent portion wherein the clutch hydraulic pressure changes from said clutch preparation pressure to a clutch completely engaging pressure while the brake hydraulic pressure is a completely disengaging pressure.

11. A tracked vehicle in accordance with claim 10, wherein said vehicle is a bulldozer.

12. A steering control method for a tracked vehicle having a steering lever, a right drive sprocket which is powered via a right clutch and a right brake, and a left drive sprocket which is powered via a left clutch and a left brake, said method comprising the steps of:
generating electrical steering control signals corresponding to an amount of movement of said steering lever from its neutral position; and
separately controlling said right clutch, said left clutch, said right brake, and said left brake in response to said steering control signals;
wherein said steering lever has a full stroke position for rightward turning of the vehicle and a full stroke position for leftward turning of the vehicle; wherein said right clutch and said right brake are controlled when said steering lever is moved between said neutral position and said full stroke position for rightward turning; and wherein said left clutch and said left brake are controlled when said steering lever is moved between said neutral position and said full stroke position for leftward turning;
wherein each of said right clutch and said left clutch is controlled by varying a clutch hydraulic pressure applied thereto; wherein each of said right brake and said left brake are controlled by varying a brake hydraulic pressure applied thereto; wherein in response to said steering control signals changes with time of the steering control signals for one of said clutches and for the brake associated therewith, when amount of operation of said steering lever increases from a neutral position to its full stroke, include:
- (a) a first range in which the clutch hydraulic pressure changes from a clutch completely engaging pressure to a clutch engagement maintaining pressure corresponding to the stroke position of said steering lever, while the brake hydraulic pressure is a brake completely disengaging pressure, and
- (b) a second range in which the clutch hydraulic pressure changes from the clutch engagement maintaining pressure to a clutch completely disengaging pressure while the brake hydraulic pressure changes from a braking preparation pressure, which is slightly higher than an initiating brake engagement pressure, to a brake completely engaging pressure;

and wherein the changes with time of the steering control signals outputted to control valve of said one of said clutches and to control valve of the brake associated therewith, when the amount of operation of said steering lever decreases from its full stroke to a neutral position, include:
- (c) a third range in which the brake hydraulic pressure changes from a brake completely engaging pressure to a brake engagement maintaining pressure corresponding to the stroke of said steering lever, with the clutch hydraulic pressure being the clutch completely disengaging pressure, and
- (d) a fourth range in which the brake hydraulic pressure changes from the brake engagement maintaining pressure to the brake completely disengaging pressure while the clutch hydraulic pressure changes from a clutch preparation pressure, which is slightly higher than a clutch engagement initiating pressure, to the clutch completely engaging pressure;

wherein said first range and said third range overlap, and further comprising adjusting the degree of overlap of said first range and said third range.

13. A method in accordance with claim 12, wherein said first range has:
- an initial portion wherein the clutch hydraulic pressure changes from a clutch completely engaging pressure to a maximum value of a clutch engagement maintaining pressure while the brake hydraulic pressure is a brake completely disengaging pressure, and
- a subsequent portion wherein the clutch hydraulic pressure remains at a maximum value of a clutch engagement maintaining pressure while the brake hydraulic pressure remains at a brake completely disengaging pressure;

wherein said second range has:
- an initial portion wherein the brake hydraulic pressure changes from the brake completely disengaging pressure to said braking preparation pressure and the clutch hydraulic pressure changes from the maximum value of a clutch engagement maintaining pressure to a clutch completely disengaging pressure, and
- a subsequent portion wherein the brake hydraulic pressure changes from said braking preparation pressure to a brake completely engaging pressure while the clutch hydraulic pressure is a clutch completely disengaging pressure;

wherein said third range has:
- an initial portion wherein the brake hydraulic pressure changes from a brake completely engaging pressure to a maximum value of a brake engagement maintaining pressure while the clutch hydraulic pressure is a clutch completely disengaging pressure, and
- a subsequent portion wherein the brake hydraulic pressure is a maximum value of the brake engagement maintaining pressure while the clutch hydraulic pressure is a clutch completely disengaging pressure;

wherein said fourth range has:
- an initial portion wherein the clutch hydraulic pressure changes from a clutch completely disengaged pressure to a clutch preparation pressure and the brake hydraulic pressure changes from a maximum value of the brake engagement maintaining pressure to a brake completely disengaging pressure, and
- a subsequent portion wherein the clutch hydraulic pressure changes from said clutch preparation pressure to a clutch completely engaging pressure while the brake hydraulic pressure is a completely disengaging pressure.

14. A method in accordance with claim 13, further comprising
determining an angle of inclination of the vehicle in a longitudinal direction thereof; and
controlling a time interval from a disengagement of the clutch to an initiation of the braking and a time interval from a disengagement of the brake to an engagement of the clutch on the basis of the angle of inclination of the vehicle in the longitudinal direction thereof.

15. A steering control method for a tracked vehicle having a steering lever, a right drive sprocket which is powered via a right clutch and a right brake, and a left drive sprocket which is powered via a left clutch and a left brake, said method comprising the steps of:
generating electrical steering control signals corresponding to an amount of movement of said steering lever from its neutral position; and
separately controlling said right clutch, said left clutch, said right brake, and said left brake in response to said steering control signals;
determining an angle of inclination of the vehicle in a longitudinal direction thereof; and
controlling a time interval from a disengagement of the clutch to an initiation of the braking and a time interval from a disengagement of the brake to an engagement of the clutch on the basis of the angle of inclination of the vehicle in the longitudinal direction thereof.

* * * * *